(12) United States Patent
Tanaka (10) Patent No.: US 9,302,547 B2
(45) Date of Patent: Apr. 5, 2016

(54) PNEUMATIC TIRE

(71) Applicant: Sumitomo Rubber Industries, Ltd., Kobe-shi, Hyogo (JP)

(72) Inventor: Susumu Tanaka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 300 days.

(21) Appl. No.: 13/958,084

(22) Filed: Aug. 2, 2013

(65) Prior Publication Data

US 2014/0090759 A1 Apr. 3, 2014

(30) Foreign Application Priority Data

Oct. 2, 2012 (JP) ................................. 2012-220777

(51) Int. Cl.
*B60C 11/04* (2006.01)
*B60C 11/12* (2006.01)
*B60C 11/03* (2006.01)

(52) U.S. Cl.
CPC ............ *B60C 11/0304* (2013.04); *B60C 11/03* (2013.01); *B60C 11/0306* (2013.04); *B60C 2011/036* (2013.04); *B60C 2011/039* (2013.04); *B60C 2011/0341* (2013.04); *B60C 2011/0344* (2013.04); *B60C 2011/0353* (2013.04); *B60C 2011/0365* (2013.04); *B60C 2011/0372* (2013.04); *B60C 2011/0381* (2013.04); *B60C 2011/0386* (2013.04); *B60C 2011/0395* (2013.04); *B60C 2011/1254* (2013.04)

(58) Field of Classification Search
CPC ............ B60C 11/0304; B60C 11/0306; B60C 2011/0344
See application file for complete search history.

(56) References Cited

U.S. PATENT DOCUMENTS

| 4,387,754 | A | * | 6/1983 | Mirtain et al. | ............. 152/209.1 |
| 5,343,918 | A | * | 9/1994 | Fontaine | .................... 152/209.5 |
| 5,580,404 | A | * | 12/1996 | Hitzky | ...................... 152/209.22 |
| 6,923,231 | B2 | * | 8/2005 | Cantu' et al. | ............ 152/209.18 |
| 2006/0137791 | A1 | | 6/2006 | Miyabe et al. | |
| 2012/0160385 | A1 | * | 6/2012 | Tanaka | ..................... 152/209.22 |

FOREIGN PATENT DOCUMENTS

| EP | 2 468 535 A1 | 6/2012 |
| EP | 2 660 078 A1 | 11/2013 |
| JP | 2010-076561 A | 4/2010 |
| JP | 2012-136187 A | 7/2012 |

* cited by examiner

*Primary Examiner* — Steven D Maki
*Assistant Examiner* — Robert Dye
(74) *Attorney, Agent, or Firm* — Birch, Stewart, Kolasch & Birch, LLP (57) ABSTRACT

A pneumatic tire comprises a tread portion divided by three circumferentially continuously extending main grooves into two crown land portions and two shoulder land portions. The axial width W2 of the shoulder land portion is 1.15 to 2.0 times the axial width W1 of the crown land portion. Crown axial grooves disposed in the crown land portions have a groove width of at most 2 mm and are inclined to the opposite direction to the inclining direction of the radially outermost belt ply cords. Shoulder axial grooves disposed in the shoulder land portions are inclined to the same direction as the inclining direction of the radially outermost belt ply cords. Each of the shoulder axial grooves is not connected to the main groove or alternatively connected to the main groove through a narrow part having a width of 1.2 mm or less.

5 Claims, 10 Drawing Sheets

000# PNEUMATIC TIRE

BACKGROUND OF THE INVENTION

The present invention relates to a pneumatic tire having an improved tread pattern.

In order to improve the aquaplaning resistance of a pneumatic tire, widely employed techniques for increasing the drainage of tread grooves are: to increase the number of the tread grooves, to increase the width of a tread groove and/or to increase the depth of a tread groove. Such techniques however have disadvantages such that the tread pattern rigidity is decreased, the steering stability on dry roads is deteriorated, and the noise performance is deteriorated.

Figure 10:
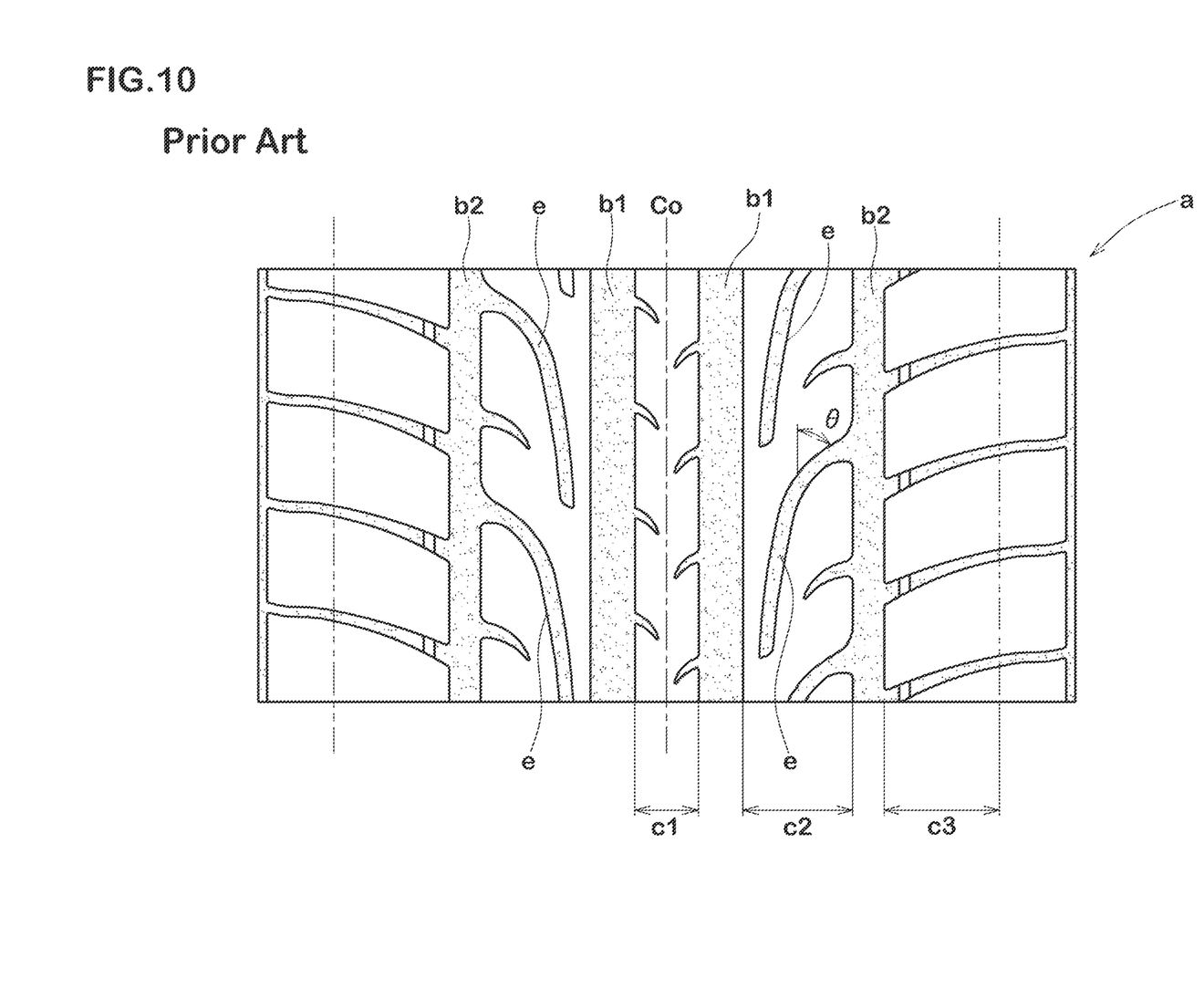
FIG. 10 shows a tread pattern of prior art.

US Patent Application Publication No. 2006-137791A1 discloses a tread pattern shown in FIG. 10, wherein a central rib c1 and middle ribs c2 extend continuously in the circumferential direction to improve the steering stability, oblique grooves (e) disposed in the middle ribs c2 are connected to shoulder circumferential grooves b2 to improve the drainage, and the oblique grooves (e) are not connected to crown circumferential grooves b1 to block air column resonance sound possibly occurring in the crown circumferential grooves b1. In such a tire, however, further improvement is demanded about the noise performance, the steering stability, ride comfort and aquaplaning resistance.

SUMMARY OF THE INVENTION

An object of the present invention is to provide a pneumatic tire in which the aquaplaning resistance is improved without deteriorating the noise performance, steering stability and ride comfort.

According to the present invention, a pneumatic tire comprise a tread portion provided with three circumferentially continuously extending main grooves, a pair of bead portions each with a bead core therein, a pair of sidewall portions extending between the tread portion and the bead portions, a carcass extending between the bead portions through the tread portion and the sidewall portions, and a radially outermost belt ply of cords disposed radially outside the carcass in the tread portion and inclined to one direction with respect to the tire axial direction, the main grooves including
a center main groove extending along the tire equator and
a pair of shoulder main grooves disposed one on each side of the center main groove so that the tread portion is provided on each side of the center main groove with
a crown land portion between the center main groove and the shoulder main groove and
a shoulder land portion between the shoulder main groove and the tread edge, wherein
the ratio W2/W1 of the average axial width W2 of the shoulder land portion to the average axial width W1 of the crown land portion is 1.15 to 2.0 under a 70% loaded state of the tire in which the tire is mounted on a standard rim, inflated to a standard pressure and loaded with 70% of a standard tire load, the crown land portion is provided with crown axial grooves having a width of not more than 2 mm and inclined with respect to the tire axial direction to the opposite direction to the inclining direction of the cords of the radially outermost belt ply, the shoulder land portion is provided with shoulder axial grooves inclined with respect to the tire axial direction toward the same inclining direction as the cords of the radially outermost belt ply, each of the shoulder axial grooves has no substantial connection with the shoulder main groove such that it is connected to the shoulder main groove through a part having a width of not more than 1.2 mm or alternatively it is not connected to the shoulder main groove.

Therefore, the crown land portions are relatively decreased in the axial width, and the ground pressure of the tread portion is relatively increased in the crown land portions. AS a result, in the vicinity of the crown land portions, the drainage is enhanced and the aquaplaning resistance can be improved.

since the crown axial grooves are formed as a very narrow groove, the decrease in the rigidity of the crown land portions due to the formation of the crown axial grooves can be minimized, and the resultant deterioration of the steering stability can be prevented.

Since the volume of the air in the crown axial groove is very small, even if the air flows into the main grooves, it is hard to induce air column resonance in the main grooves. Therefore, the deterioration of the noise performance due to the air column resonance can be prevented.

Similarly, the shoulder axial grooves are hard to induce air column resonance in the shoulder main grooves.

Further, by the shoulder axial grooves, the rigidity of the shoulder land portions becomes moderate, and the ride comfort can be improved.

The pneumatic tire according to the present invention may be provided with the following features (1)-(8):

(1) the tread portion is provided with a tread pattern which is asymmetry about the tire equator and has an outboard tread edge intended to be located on the outside of a vehicle and an inboard tread edge intended to be located on the inside of the vehicle,
the shoulder axial grooves on the outboard tread edge side are not connected to the shoulder main groove and
the shoulder axial grooves on the inboard tread edge side include those connected to the shoulder main groove;

(2) the ratio W2/W1 is 1.15 to 1.55;

(3) the angle α of each of the crown axial grooves with respect to the tire circumferential direction is in a range of from 30 to 80 degrees, and
the angle β of each of the shoulder axial grooves with respect to the tire circumferential direction is in a range of from 60 to 90 degrees;

(4) the shoulder axial grooves include those having a closed end terminating within the shoulder land portion;

(5) the crown axial grooves include main crown axial grooves extending across the entire width of the crown land portion;

(6) the crown axial grooves include secondary crown axial grooves each extending from the center main groove or alternatively the shoulder main groove and terminating within the crown land portion;

(7) the secondary crown axial grooves include
axially inside secondary crown axial grooves extending from the center main groove and
axially outside secondary crown axial grooves extending from the shoulder main groove, and
the axially inside secondary crown axial grooves are respectively aligned with the axially outside secondary crown axial grooves;

(8) junction points of the axially outside secondary crown axial grooves with the shoulder main groove are provided with chamfers, In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa.

The tread edges Te are the axial outermost edges of the ground contacting patch of the tire (camber angle=0) under a 70% loaded state of the tire in which the tire is mounted on the standard rim and inflated to the standard pressure and loaded with 70% of the standard tire load, The tread width TW is the axial distance between the tread edges Te measured in the normally inflated unloaded condition of the tire.

DESCRIPTION OF THE PREFERRED EMBODIMENTS

Embodiments of the present invention will now be described in detail in conjunction with the accompanying drawings.

Figure 1:
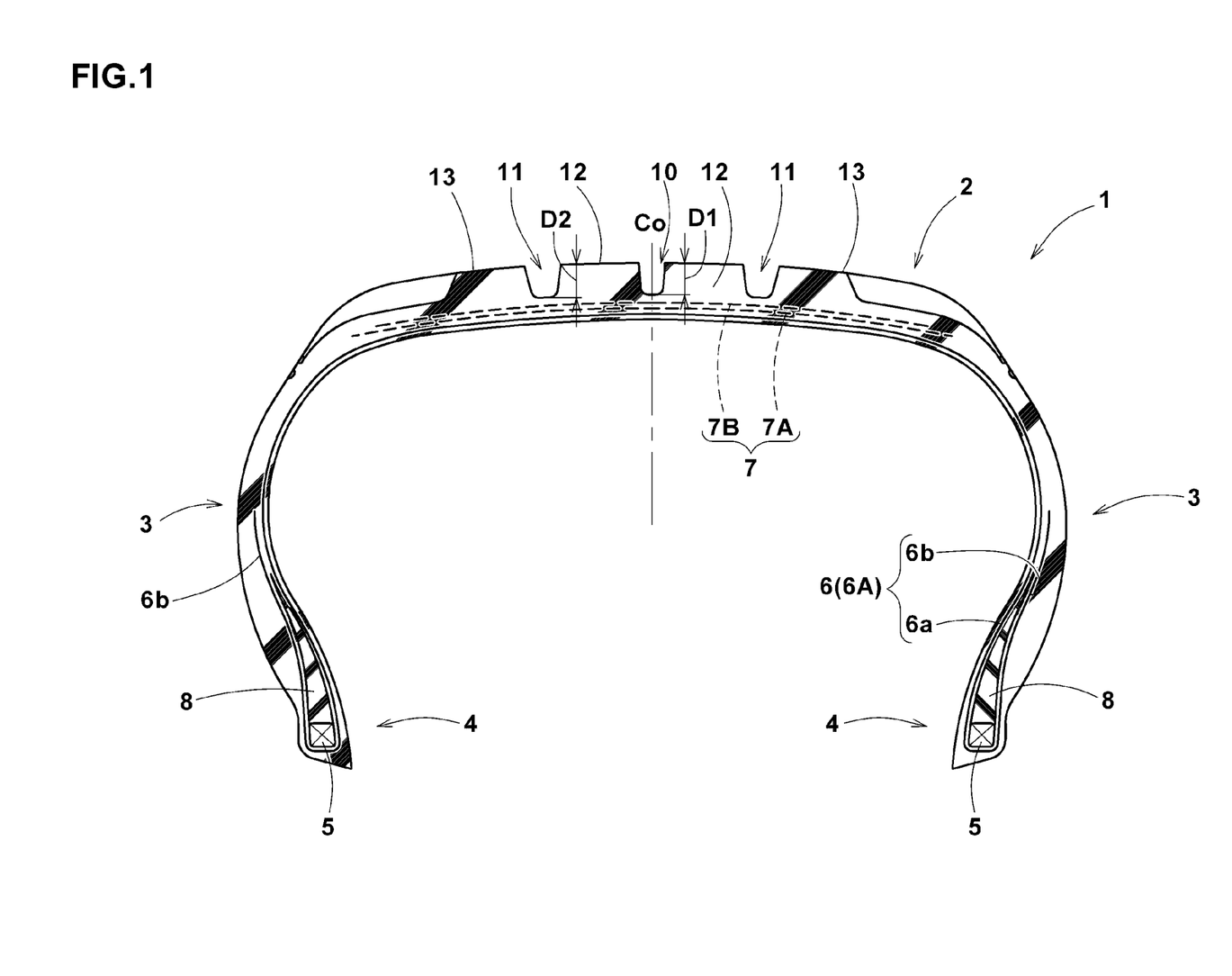
FIG. 1 is a cross sectional view of a pneumatic tire as an embodiment of the present invention.

According to the present invention, pneumatic tire 1 comprises a tread portion 2, a pair of axially spaced bead portions 4 each with a bead core 5 therein, a pair of sidewall portions 3 extending between the tread edges and the bead portions 4, a carcass 6 extending between the bead portions 4, and a tread reinforcing belt 7 disposed radially outside the carcass 6 in the tread portion 2.

In the drawings, the pneumatic tire 1 as an embodiment of the present invention is designed as a passenger tire.

The carcass 6 is composed of at least one ply 6A of cords arranged radially at an angle in the range of from 75 to 90 degrees with respect to the tire equator C, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A of cords arranged radially at an angle of 90 degrees with respect to the tire equator C.

The bead portions 4 are each provided between the main portion 6a and turned up portion 6b of the carcass ply 6A with a bead apex 8 made of a hard rubber extending radially outwardly from the bead core 5 in a tapered manner in order to reinforce the bead portion 4.

Figure 5:
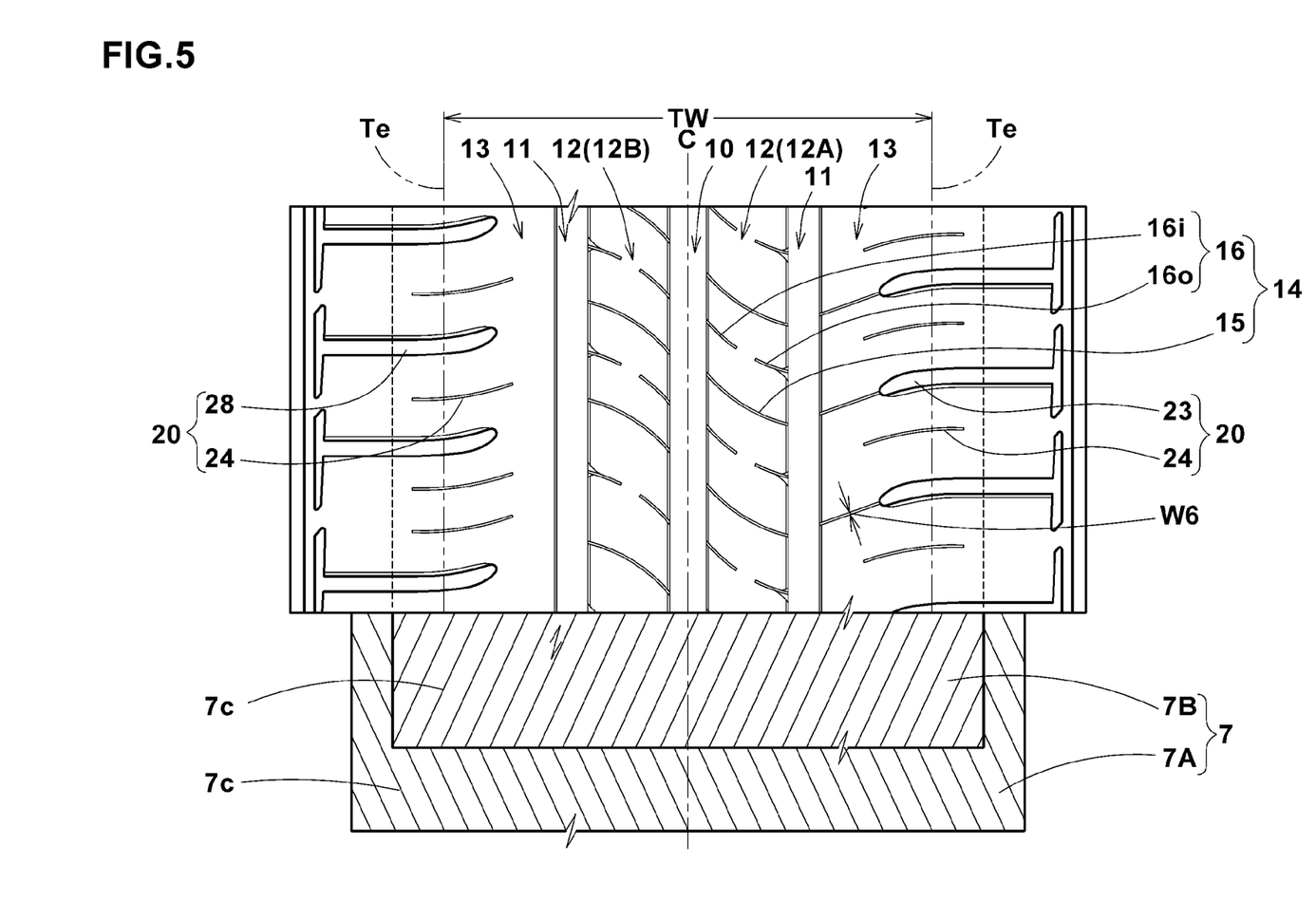
FIG. 5 shows a relationship between inclinations of tread grooves and the inclination of the radially outermost belt ply cords.

The belt 7 comprises at least one ply, in this example as shown in FIG. 5 two cross plies 7A and 7B of belt cords 7c laid at an angle of from 10 to 35 degrees with respect to the tire equator C. For the belt cords, organic fiber cords such as polyethylene naphtalate, polyethylene terephthalate, aromatic polyamide and the like may be used.

The tread portion 2 is provided with tread grooves forming a tread pattern.

Figure 2:
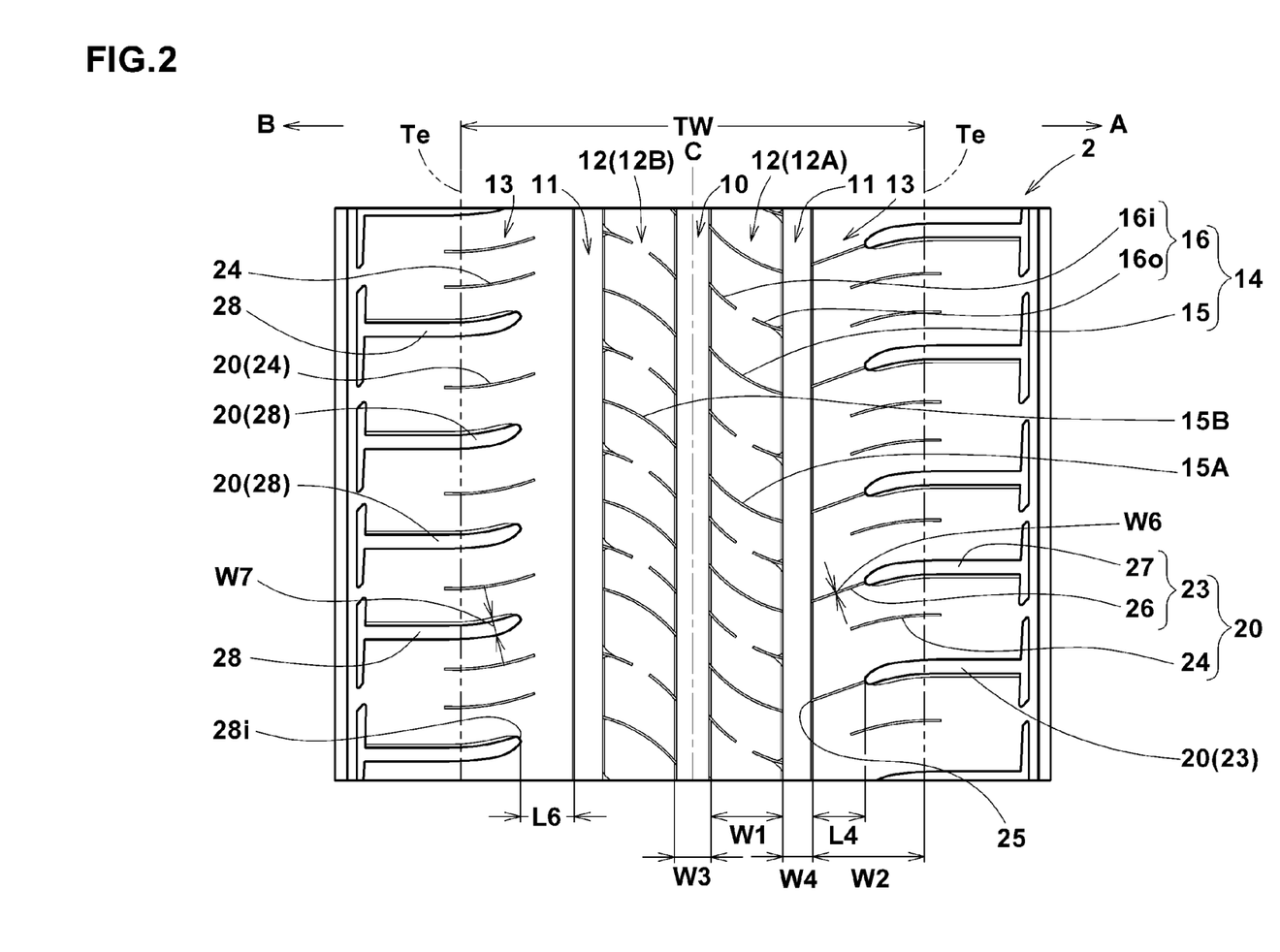
FIG. 2 is a developed partial view of the tread portion thereof showing an example of the tread pattern.
Figure 3:
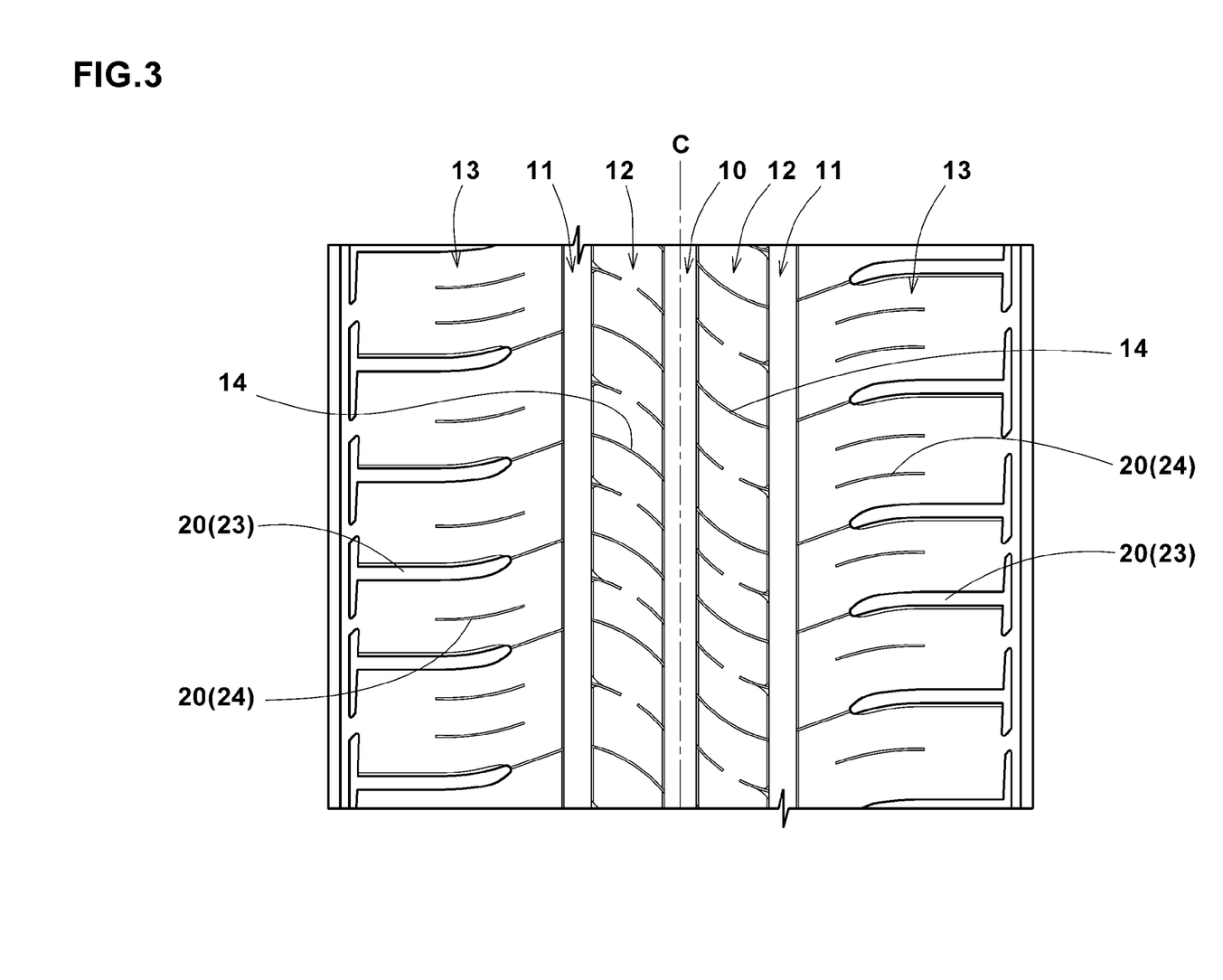
FIG. 3 shows another example of the tread pattern.
Figure 4:
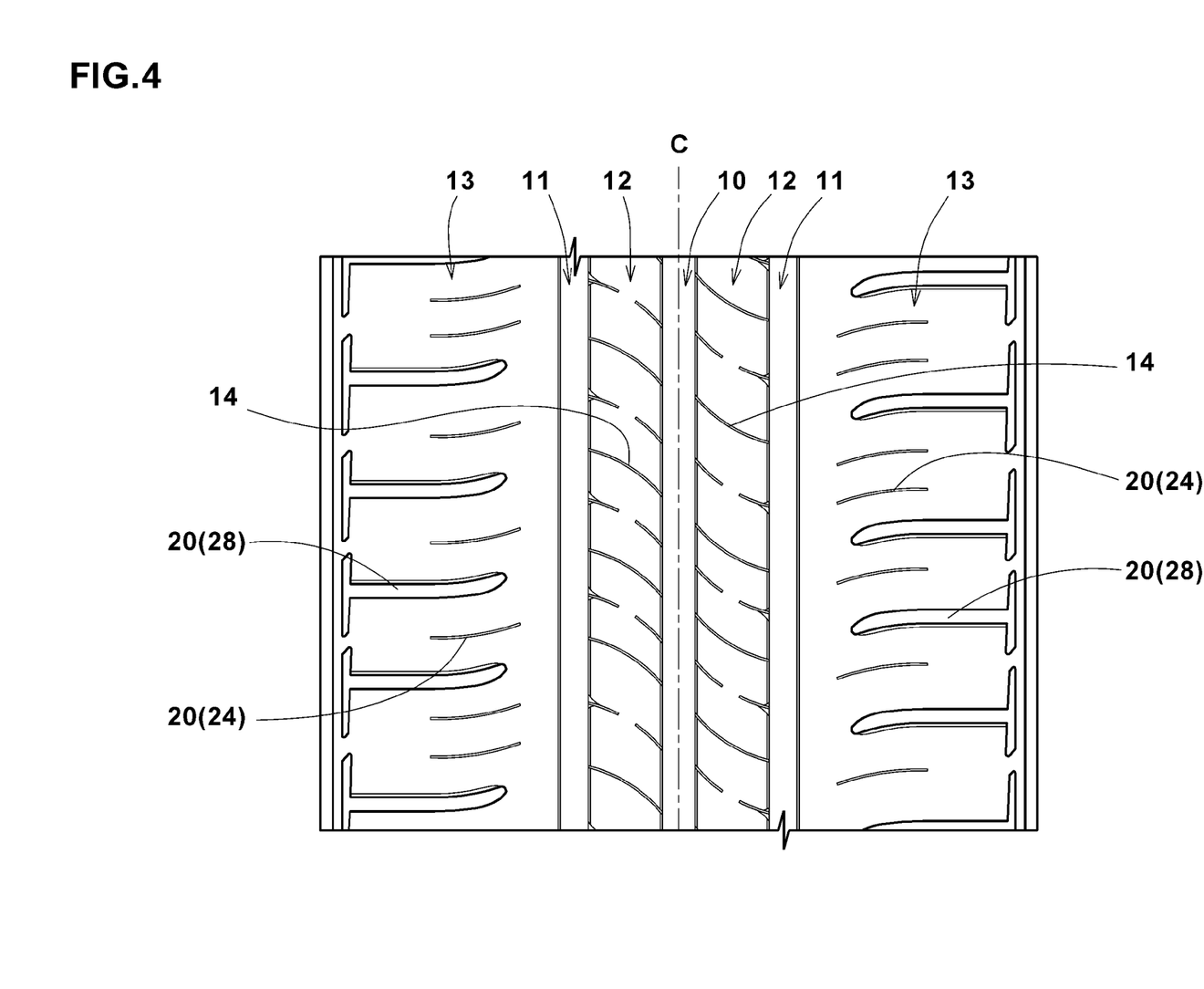
FIG. 4 shows still another example of the tread pattern.

FIG. 2 shows an example of the tread pattern. FIG. 3 shows another example of the tread pattern which is a modification of that shown in FIG. 2. FIG. 4 shows still another example of the tread pattern which is a modification of that shown in FIG. 2.

In the example shown in FIG. 2, the tread pattern is left-right asymmetry (asymmetry about the tire equator). Although the tire in this example is nondirectional (or bidirectional), the mounting position of the tire (the inside (A) and outside (B) of the tire) is specified. For example, the sidewall portion to be located on the outside when installed on the vehicle is provided with an indication such as "outside", and the sidewall portion to be located on the inside is provided with an indication such as "inside".

For ease of the following explanation, the tread edge Te to be positioned away from the center of the vehicle body may be referred to as "outboard tread edge", and the tread edge Te to be positioned close to the center of the vehicle body may be referred to as "inboard tread edge".

In contrast to the FIG. 2 example, the tread patterns shown in FIG. 3 and FIG. 4 are symmetry about the tire equator. Thus, the tire is nondirectional (or bidirectional), and the mounting position is not limited.

The tread grooves forming such tread patterns include three circumferentially continuously extending main grooves which are a center main groove 10 disposed along the tire equator C, and two shoulder main grooves 11 disposed one on each side of the center main groove 10.

By the three main grooves 10 and 11, the tread portion 2 is divided into four land portions (annular regions) which are a pair of crown land portions 12 between the center main groove 10 and the shoulder main grooves 11 and
a pair of shoulder land portion 13 axially outside the shoulder main grooves 11.

The center main grooves 10 and shoulder main grooves 11 may be formed in various configurations such as wavy configuration and zigzag configuration. In this embodiment, however, in order to provide a good drainage for the tread portion 2, the center main groove 10 is formed as a straight groove which has a substantially constant axial width and whose widthwise center line coincides with the tire equator C. The shoulder main grooves 11 are also formed as a straight groove which has a substantially constant axial width. Thus, the crown land portion 12 has a substantially constant axial width W1 and extends straight in the tire circumferential direction. Also the shoulder land portions 13 each have a substantially constant axial width W2 (the width between the shoulder main groove and the tread edge Te).

In the case of a passenger tire, in order to secure a good drainage and not to decrease the rigidity of the crown land portions 12 and shoulder land portions 13, the width W3 of the center main groove 10 is preferably set in a range of from 6.0 to 8.0% of the tread width TW, the width W4 of the shoulder main groove 11 is preferably set in a range of from 5.0 to 7.0% of the tread width TW, the depth D1 of the center main groove 10 and the depth D2 of the shoulder main groove 11 are preferably set in a range of from 6.0 to 9.0 mm.

The ratio W2/W1 of the average axial width W1 of the crown land portion 12 to the average axial width W2 of the shoulder land portion 13 under the 70% loaded state is set in a range of from 1.15 to 2.0, more preferably 1.15 to 1.55. If the ratio W2/W1 is less than 1.15, the width W1 of the crown land portions 12 is relatively increased and further the shoulder main groove 11 becomes distant from the tire equator C, therefore, it becomes difficult to improve the aquaplaning resistance. If the ratio W2/W1 is more than 2.0, as the width W1 of the crown land portion 12 is relatively decreased, it becomes difficult to maintain a necessary rigidity for the crown land portion 12, and the steering stability is deteriorated.

The crown land portions 12 are each provided with crown axial grooves 14. The crown axial grooves 14 include main crown axial grooves 15 extending across the entire width of the crown land portion 12, and secondary crown axial grooves 16 each extending from the shoulder main groove 11 or the center main groove 10 and terminating within the crown land portion 12.

With respect to the tire circumferential direction, all the crown axial grooves 14 are inclined to the opposite direction to the inclining direction of the belt cords 7c of the radially outermost belt ply 7B as shown in FIG. 5.

In the case of FIG. 5, the belt cord 7c of the radially outermost belt ply 7B have a right-up inclination, and the crown axial grooves 14 have a right-down inclination.

The width W5 of each of the crown axial grooves 14 is set in a range of not more than 2 mm, preferably in a range of from 0.3 to 1.2 mm.

The angle α of each of the crown axial grooves 14 is preferably set in a range of not less than 30 degrees, more preferably not less than 45 degrees, but not more than 80 degrees, more preferably not more than 65 degrees with respect to the tire circumferential direction.

By the formation of such crown axial grooves 14, the bending rigidity of the crown land portion 12 itself becomes decreased in the perpendicular direction to the longitudinal direction of the crown axial grooves 14. But, as the belt cords 7c extend in the perpendicular direction, the decrease in the bending rigidity is compensated, and the steering stability can be improved.

If the width W5 becomes more than 2 mm, the bending rigidity of the crown land portion 12 largely decreases and it becomes difficult to compensate the decrease in the bending rigidity and improve the steering stability.

Further, the volume of the air flowing into the main groove 10, 11 from the crown axial groove 14 increases, and there is a possibility that air column resonance deteriorating the noise performance occurs in the main groove.

If the angle α becomes less than 30 degrees with respect to the tire circumferential direction, the axial rigidity of the crown land portion 12 is decreased, and there is a possibility that the steering stability is deteriorated.

In this embodiment, the main crown axial grooves 15 and the secondary crown axial grooves 16 are arranged alternately in the tire circumferential direction in order to maintain the rigidity necessary for the crown land portion 12 and improve the steering stability.

Figure 6:
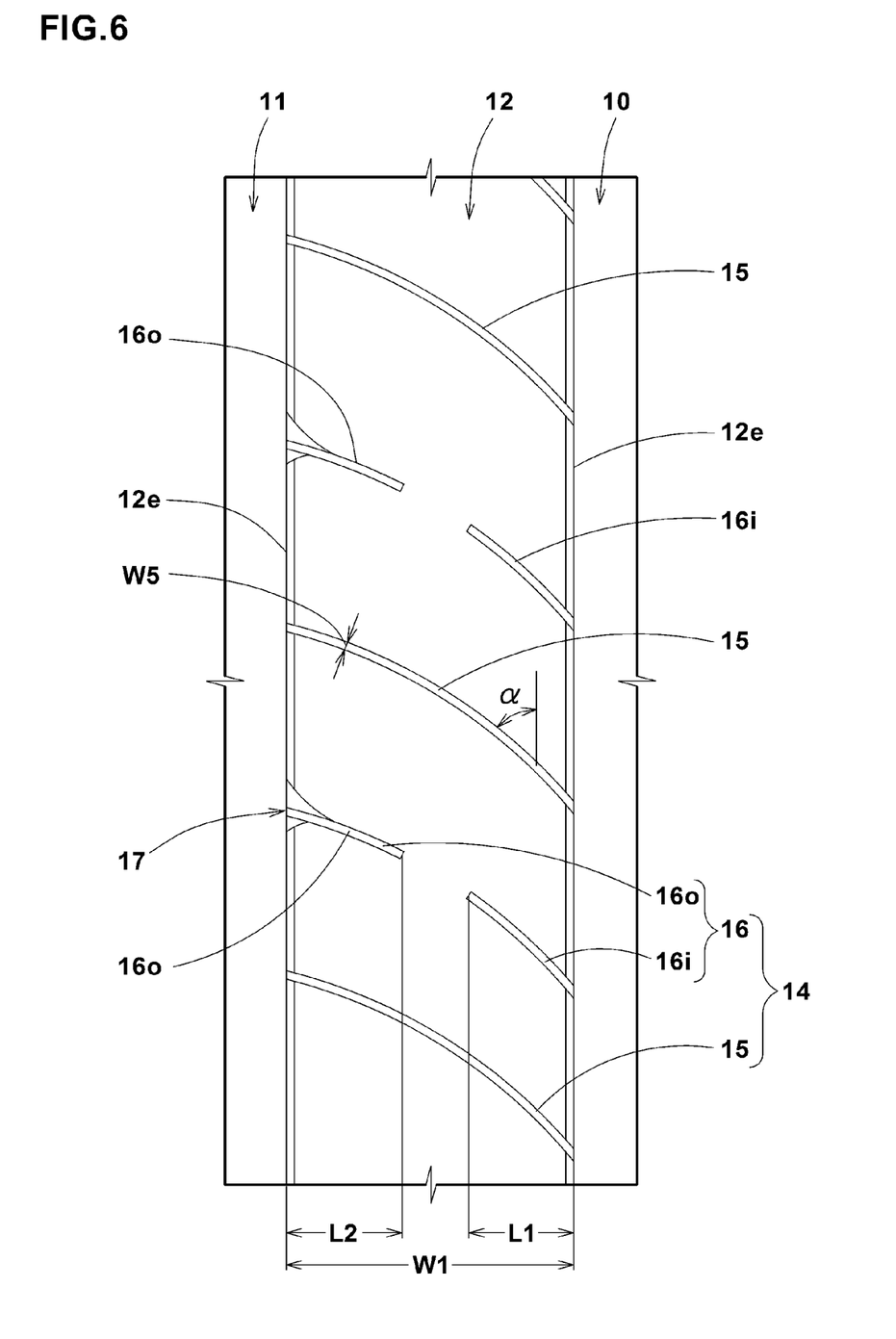
FIG. 6 is an enlarged partial top view of the crown land portion shown in FIGS. 2, 3 and 4.

As shown in FIG. 6, the secondary crown axial grooves 16 are a semi-open groove having a closed end and an open end, and having a groove width same as the circumferentially adjacent main crown axial grooves 15.

Further, the secondary crown axial grooves 16 are curved in the same manner as the circumferentially adjacent main crown axial grooves 15 in substantially parallel therewith.

In this embodiment, the secondary crown axial grooves 16 in each of the crown land portions 12 are axially inside secondary crown axial grooves 16i connected to the center main groove 10 and axially outside secondary crown axial grooves 16o connected to the shoulder main groove 11.

The axially inside secondary crown axial grooves 16i are arranged in line with the respective axially outside secondary crown axial grooves 16o so that each of the axially inside secondary crown axial grooves 16i and the corresponding one of the axially outside secondary crown axial grooves 16o extend along a curved line parallel with the circumferentially adjacent main crown axial grooves 15.

AS shown in FIG. 6, the axial lengths L1 and L2 of the axially inside and axially outside secondary crown axial grooves 16i and 16o, respectively, are preferably set in a range of not less than 0.35 times, more preferably not less than 0.38 times, but not more than 0.45 times, more preferably not more than 0.42 times the axial width W1 of the crown land portion 12 in order to provide strength for the portion between the closed ends of the grooves 16i and 16o.

In each of the crown land portions 12, all the main crown axial grooves 15 disposed therein are curved convexly toward the same circumferential direction.

In this embodiment, as shown in FIGS. 2, 3 and 4, the main crown axial groove 15A in one crown land portion 12A are curved convexly toward one circumferential direction (in the figures downward), and the main crown axial groove 15B in the other crown land portion 12B are curved convexly toward the other circumferential direction (in the figures upward) in order to reduce or eliminate rotational direction dependency of the tire performance and thereby, even in the asymmetrical tread pattern, to enable the tire rotation between the right side and left side of the vehicle.

In this embodiment, as shown in FIGS. 2, 3 and 4, each of the shoulder land portions 13 is provided with shoulder axial grooves 20 slightly curved toward the same direction. Between the shoulder land portions 13, the direction of the curve is reversed.

With respect to the tire axial direction, the shoulder axial grooves 20 are inclined toward the same circumferential direction as the belt cords 7c of the radially outermost belt ply 7B as shown in FIG. 5. In the case of FIG. 5, the shoulder axial grooves 20 have a right-up inclination in the same way as the belt cord 7c of the radially outermost belt ply 7B.

Figure 7:
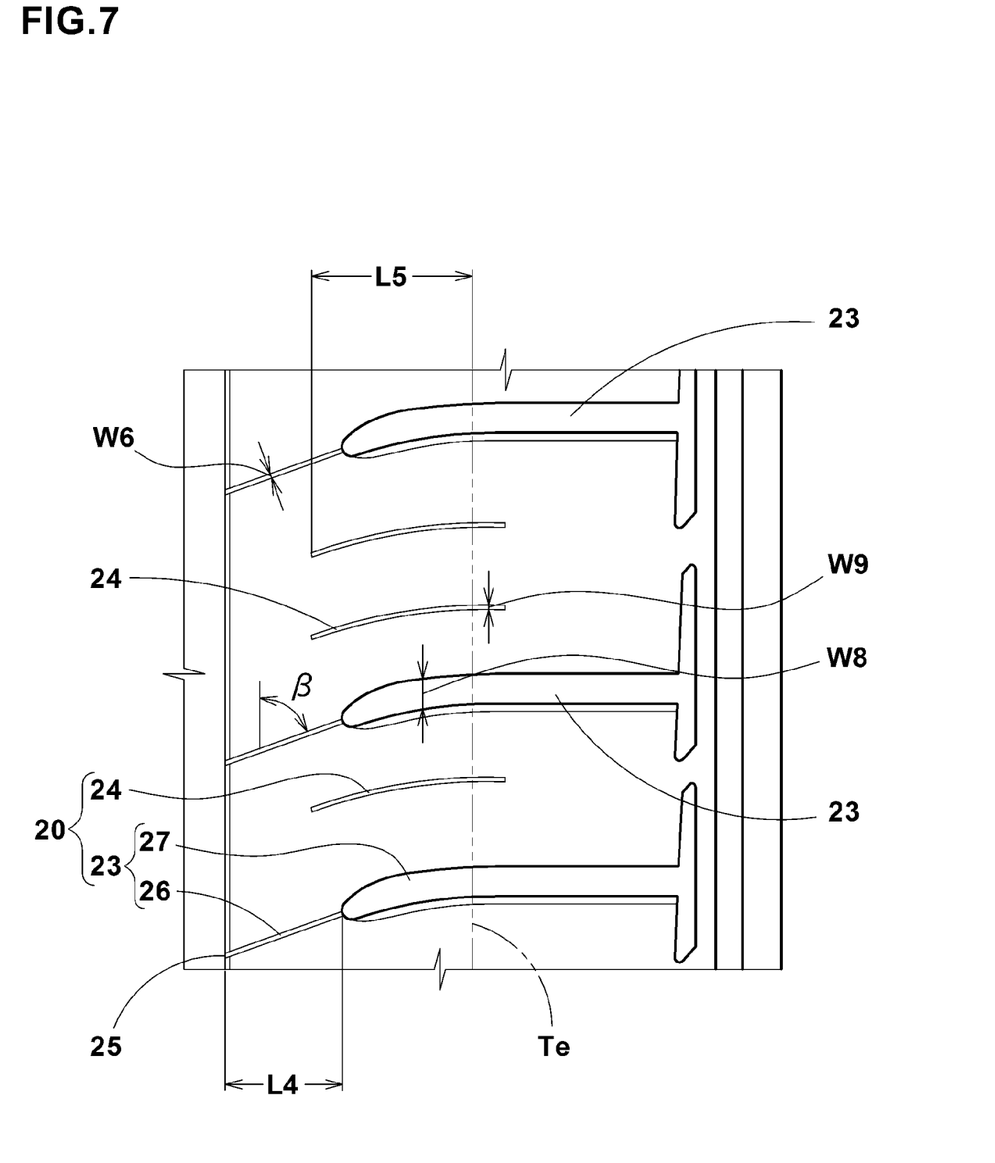
FIG. 7 is an enlarged partial top view of the shoulder land portion shown in FIGS. 2 and 3.

The angle β of each of the shoulder axial grooves 20 is preferably set in a range of not less than 60 degrees, more preferably not less than 70 degrees, but not more than 90 degrees, more preferably not more than 80 degrees with respect to the tire circumferential direction as shown in FIG. 7. Therefore, the rigidity of the shoulder land portions 13 is reduced to improve the ride comfort.

If the angle β is less than 60 degrees, there is a possibility that the axial rigidity of the shoulder land portion 13 is decreased and the steering stability is deteriorated.

According to the present invention, each of the shoulder axial grooves 20 is not connected to the shoulder main groove 11 or alternatively connected to the shoulder main groove 11 through a narrow part 26 having a width W6 of not more than 1.2 mm. Thus, it can be said that each of the shoulder axial grooves 20 has no substantial connection with the shoulder main groove 11.

The shoulder axial grooves 20 not connected to the shoulder main groove 11 include a narrow shoulder axial groove 24 and a wide shoulder axial groove 28.

The narrow shoulder axial groove 24 not connected to the shoulder main groove 11, has an axial inner end terminated within the shoulder land portion 13 and extends axially outwardly beyond the tread edge Te under the 70% loaded state. In order to improve wet performance such as wet grip and not to excessively decrease the rigidity of the shoulder land portion 13 to secure the steering stability, the axial length L5 of the shoulder axial groove 24 is preferably set in a range of not less than 0.65 times, more preferably not less than 0.7 times, but not more than 0.8 times, more preferably not more than 0.75 times the axial width W2 of the shoulder land portion 13, and the width W9 of the shoulder axial groove 24 is preferably set in a range of not less than 0.3 mm, more preferably not less than 0.6 mm, but not more than 1.2 mm, more preferably not more than 0.9 mm.

The wide shoulder axial grooves 28 not connected to the shoulder main groove 11, has an axial inner end terminated within the shoulder land portion 13 and extends axially outwardly beyond the tread edge Te under the 70% loaded state. In order to improve the drainage and not to deteriorate the steering stability, the width W7 of the wide shoulder axial groove 28 is set in a range of from 2.0 to 8.0 mm, and the axial distance L6 between the axial inner end 28*i* of the wide shoulder axial groove 28 and the shoulder main groove 11 is preferably set in a range of not less than 0.35 times, more preferably not less than 0.4 times, but not more than 0.55 times, more preferably not more than 0.5 times the axial width W2 of the shoulder land portion 13.

The shoulder axial groove 23, which is connected to the shoulder main groove 11 through the narrow part 26, has a wide main part 27 extending axially outwardly from the narrow part 26 to the tread edge Te. The narrow part 26 extends axially outwardly from the shoulder main groove 11 to the axially inner end of the wide main part 27.

The width W8 of the wide main part 27 is set in a range of from 2.0 to 8.0 mm.

The wide main part 27 is slightly curved and extends axially outwardly beyond the tread edge Te under the 70% loaded state. The wide main part 27 has a substantially same configuration as the wide shoulder axial groove 28, inclusive of the variation of the width, the depth and the curvature.

The width W6 of the narrow part 26 is preferably not more than 0.8 mm. The axial length L4 of the narrow part 26 (corresponding to the distance L6) is preferably set in a range of not less than 0.35 times, more preferably not less than 0.4 times, but not more than 0.55 times, more preferably not more than 0.5 times the axial width W2 of the shoulder land portion 13. The narrow part 26 in this example is substantially straight and inclined with respect to the tire axial direction.

The narrow part 26 prevents a massive flow of air into the shoulder main groove, therefore, the occurrence of so called pumping noise can be effectively prevented. Further, it is hard to induce air column resonance in the shoulder main groove. Thus, the noise performance can be improved. The wide main part 27 and the wide shoulder axial grooves 28 provide a good drainage. As the shoulder axial grooves 23, 24 and 28 are inclined toward the same direction as the belt cords 7*c* of the radially outermost belt ply 7B, the rigidity of the shoulder land portions 13 becomes moderate, and the ride comfort can be improved. Thus, the drainage in the shoulder land portions 13 and the ride comfort can be improved. Further, by reducing the shoulder land portions' rigidity, the ground pressure in the crown land portions is relatively increased, which helps to further improve the aquaplaning resistance.

In the asymmetrical tread pattern shown in FIG. 2, the shoulder land portion 13 on the inboard tread edge side is provided with the shoulder axial grooves 23 connected to the shoulder main groove 11 and the narrow shoulder axial grooves 24 not connected to the shoulder main groove 11, and the shoulder land portion 13 on the outboard tread edge side is provided with the wide shoulder axial grooves 28 not connected to the shoulder main groove 11 and the narrow shoulder axial grooves 24 not connected to the shoulder main groove 11 in order that the rigidity of the shoulder land portion 13 on the inboard tread edge side becomes lower than that on the outboard tread edge side.

On the inboard tread edge side, between every two adjacent shoulder axial grooves 23, one or two narrow shoulder axial grooves 24 are disposed. On the outboard tread edge side, between every two adjacent wide shoulder axial grooves 28, one or two narrow shoulder axial grooves 24 are disposed. Therefore, under such a condition that a negative camber is given to the tire, the ride comfort and aquaplaning resistance can be more effectively improved.

In the symmetrical tread pattern shown in FIG. 3, each of the shoulder land portions 13 is provided with the shoulder axial grooves 23 connected to the shoulder main groove 11 and the narrow shoulder axial grooves 24 not connected to the shoulder main groove 11.

In each shoulder land portion 13, between every two adjacent shoulder axial grooves 23, one or two narrow shoulder axial grooves 24 are disposed. Therefore, the aquaplaning resistance can be more effectively improved.

In the symmetrical tread pattern shown in FIG. 4, each of the shoulder land portions 13 is provided with the wide shoulder axial grooves 28 not connected to the shoulder main groove 11 and the narrow shoulder axial groove 24 not connected to the shoulder main groove 11.

In each shoulder land portion 13, between every two adjacent wide shoulder axial grooves 28, one or two narrow shoulder axial grooves 24 are disposed. Therefore, the noise performance and steering stability can be more effectively improved.

Figure 8:
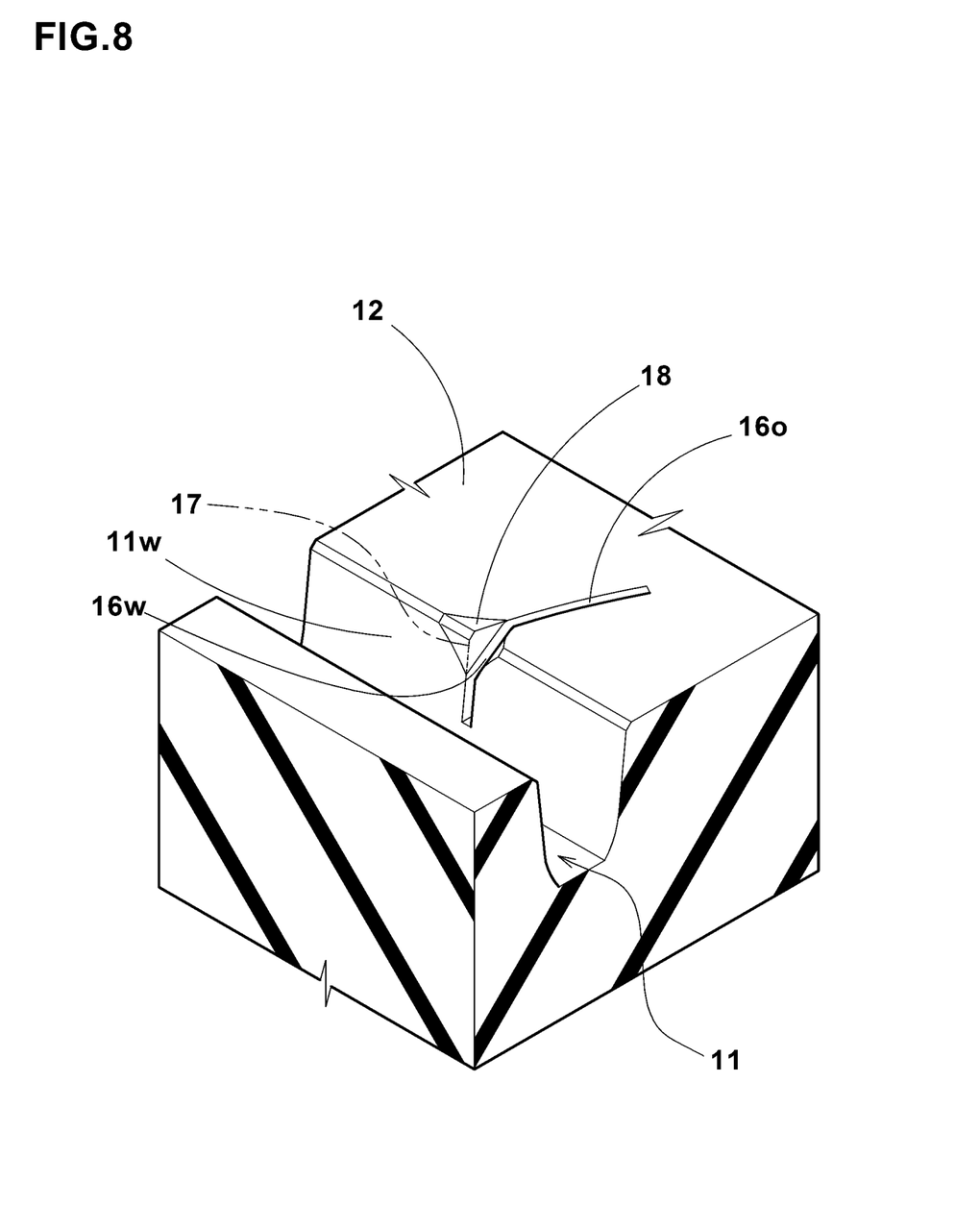
FIG. 8 is a perspective view showing a junction point of a crown axial groove with the shoulder main groove.
Figure 9:
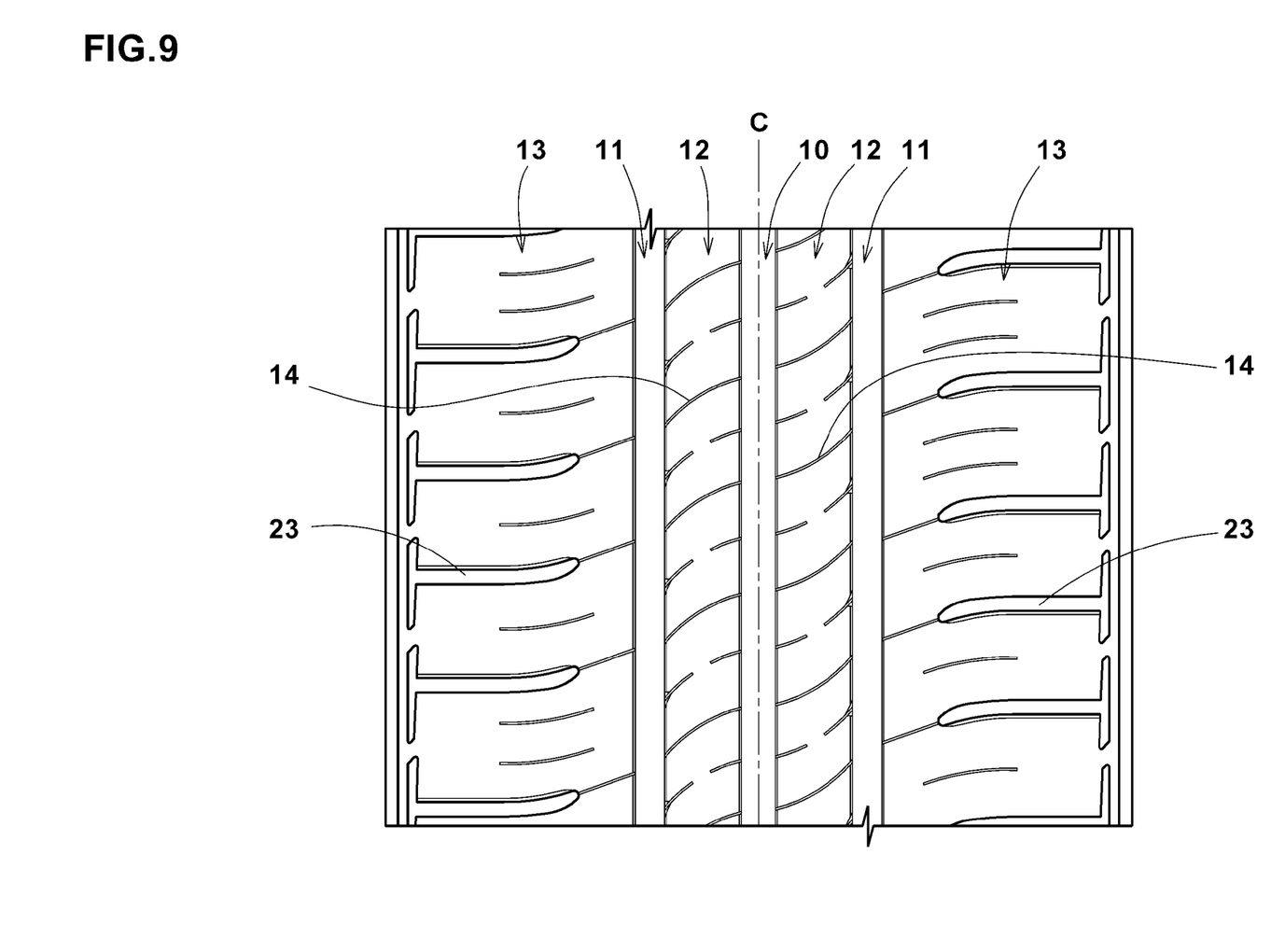
FIG. 9 shows a tread pattern used as a comparison example.

In this embodiment, as shown in FIG. 8, the junction points of the axially outside secondary crown axial grooves 16*o* with the shoulder main groove 11 are provided with chamfers 18. The chamfer 18 cuts off the corner 17 in which the following three surfaces meet: the groove sidewall 11*w* of the shoulder main groove 11, the radially outer surface of the crown land portion 12, and each of the groove sidewalls 16*w* of the axially outside secondary crown axial groove 16*o*. Each of the chamfers 18 is substantially triangular and substantially flat.

The corner 17 is relatively rigid when compared with the corner in which the following three surfaces meet: the groove sidewall 11*w* of the shoulder main groove 11, the radially outer surface of the crown land portion 12, and each of the groove sidewalls of the main crown axial grooves 15. Therefore, in order to prevent the corners 17 from chipping off, the chamfers 18 are preferably formed on only the corners 17. Further, by the chamfers 18, the drainage may be promoted to improve the aquaplaning resistance.

Comparison Tests

Passenger radial tires of size 195/65R15 (rim size: 15×6JJ) having the internal tire structure shown in FIG. 1 and tread patterns shown in FIGS. 2, 3, 4 and 9 were manufactured by way of experiment and tested for the aquaplaning resistance, noise performance, steering stability, and ride comfort.

The test results show that, in comparison with the comparative example tires, the embodiment tires were improved in the aquaplaning resistance without substantially deteriorating the noise performance, steering stability and ride comfort.

TABLE 1

(1/2)

| Tire | Ref. 1 | Ref. 2 | Ref. 3 | Ref. 4 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|
| tread pattern (Fig. no.) | 3 | 3 | 9 | 9 | 2 | 2 | 2 | 2 | 2 | 3 | 3 | 3 | 3 |
| ratio W1/W2 | 1.10 | 2.10 | 1.55 | 1.55 | 1.55 | 1.15 | 1.30 | 1.70 | 2.00 | 1.15 | 1.55 | 2.00 | 1.55 |
| crown axial groove inclination *1 | Op | Op | Op | Sm | Op | Op | Op | Op | Op | Op | Op | Op | Op |
| angle α (deg.) | 70.0 | 70.0 | 70.0 | 70.0 | 70.0 | 70.0 | 70.0 | 70.0 | 70.0 | 70.0 | 70.0 | 70.0 | 25.0 |
| shoulder axial groove inclination *1 | Sm | Sm | Op | Sm | Sm | Sm | Sm | Sm | Sm | Sm | Sm | Sm | Sm |
| angle β (deg.) | 80.0 | 80.0 | 80.0 | 80.0 | 80.0 | 80.0 | 80.0 | 80.0 | 80.0 | 80.0 | 80.0 | 80.0 | 80.0 |
| width W5 of crown axial grooves (mm) | 0.6 | 0.6 | 0.6 | 0.6 | 0.6 | 0.6 | 0.6 | 0.6 | 0.6 | 0.6 | 0.6 | 0.6 | 0.6 |
| width of narrow part 26 (mm) | 0.6 | 0.6 | 0.6 | 0.6 | 0.6 | 0.6 | 0.6 | 0.6 | 0.6 | 0.6 | 0.6 | 0.6 | 0.6 |
| aquaplaning resistance | 100 | 130 | 115 | 115 | 115 | 110 | 110 | 120 | 130 | 110 | 115 | 130 | 120 |
| noise performance | 100 | 100 | 100 | 100 | 92 | 92 | 92 | 92 | 92 | 100 | 100 | 100 | 100 |
| steering stability | 60 | 50 | 60 | 50 | 65 | 65 | 65 | 60 | 60 | 60 | 60 | 55 | 55 |
| ride comfort | 60 | 50 | 50 | 65 | 65 | 65 | 65 | 65 | 60 | 65 | 65 | 60 | 65 |

(2/2)

| Tire | Ex. 10 | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|---|
| tread pattern (Fig. no.) | 3 | 3 | 3 | 3 | 3 | 3 | 3 | 3 | 4 | 4 | 4 | 4 | 4 |
| ratio W1/W2 | 1.55 | 1.55 | 1.55 | 1.55 | 1.55 | 1.55 | 1.55 | 1.55 | 1.55 | 1.15 | 1.30 | 1.70 | 2.00 |
| crown axial groove inclination *1 | Op | Op | Op | Op | Op | Op | Op | Op | Op | Op | Op | Op | Op |
| angle α (deg.) | 85.0 | 70.0 | 70.0 | 30.0 | 80.0 | 70.0 | 70.0 | 70.0 | 70.0 | 70.0 | 70.0 | 70.0 | 70.0 |
| shoulder axial groove inclination *1 | Sm | Sm | Sm | Sm | Sm | Sm | Sm | Sm | Sm | Sm | Sm | Sm | Sm |
| angle β (deg.) | 80.0 | 80.0 | 80.0 | 80.0 | 80.0 | 80.0 | 80.0 | 80.0 | 80.0 | 80.0 | 80.0 | 80.0 | 80.0 |
| width W5 of crown axial grooves (mm) | 0.6 | 2.5 | 0.6 | 0.6 | 0.6 | 0.3 | 1.2 | 0.6 | 0.6 | 0.6 | 0.6 | 0.6 | 0.6 |
| width of narrow part 26 (mm) | 0.6 | 0.6 | 1.5 | 1.5 | 1.5 | 1.5 | 1.5 | 1.2 | — | — | — | — | — |
| aquaplaning resistance | 110 | 120 | 120 | 120 | 115 | 110 | 120 | 120 | 110 | 110 | 110 | 115 | 120 |
| noise performance | 100 | 109 | 109 | 100 | 100 | 100 | 100 | 100 | 92 | 95 | 92 | 92 | 95 |
| steering stability | 55 | 55 | 55 | 55 | 60 | 65 | 55 | 55 | 65 | 65 | 65 | 60 | 55 |
| ride comfort | 65 | 70 | 70 | 65 | 65 | 65 | 65 | 70 | 55 | 55 | 55 | 55 | 55 |

*1 Sm: same as the radially outermost belt ply cords Op: opposite to the radially outermost belt ply cords <Aquaplaning Resistance Test>

Test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on Ref.1 being 100, wherein the larger is better.

Test car: Japanese 1800 cc FF passenger car provided on all the four wheels with test tires inflated to 230 kPa <Noise Performance Test>

The test car was run on a roughened asphalt road at a speed of 60 km/h and the noise sound level resulting from the pattern noise was evaluated. The results are indicated in Table 1 by an index based on Ref.1 being 100, wherein the smaller is better.

<Steering Stability and Ride Comfort Test>

The test car was run on a dry asphalt road in a tire test course, and the test driver evaluated the steering stability and ride comfort. The results are indicated in Table 1 by an index based on Ref.1 being 60 (max.=100), wherein the larger is better.

The invention claimed is:

1. A pneumatic tire comprising:
   a tread portion;
   a pair of sidewall portions;
   a pair of bead portions each with a bead core therein;
   a carcass extending between the bead cores in the bead portions through the tread portion and the sidewall portions; and
   a belt layer comprising at least one belt ply disposed radially outward of the carcass and in tread portion, wherein the tread portion has a tread pattern with a designated install direction on a vehicle,
   the tread pattern comprises:
      a center main groove extending circumferentially of the tire so that the tire equator is included within the width thereof,
      a pair of shoulder main grooves disposed one on each side of the center main groove and circumferentially of the tire,
      a pair of crown land portions defined between the center main groove and a corresponding shoulder main groove of the pair of the shoulder main grooves, a pair of shoulder land portions which are an outboard shoulder land portion and an inboard shoulder land portion located axially outside of a respective shoulder main groove of the shoulder main grooves, crown axial grooves disposed in each of said crown land portions, and shoulder axial grooves disposed in each of said shoulder land portions, a ratio W2/W1 of an axial width W2 of each of said shoulder land portions to an axial width W1 of each of said crown land portions is in a range of from 1.15 to 2.0 under a 70% loaded state of the tire in which the tire is mounted on a standard rim, inflated to a standard pressure and loaded with 70% of a standard tire load, each of the crown axial grooves has a width of not more than 2 mm and is inclined with respect to the tire axial direction to the opposite direction to an inclining direction of cords of the radially outermost belt ply of the belt layer, the shoulder axial grooves are inclined with respect to the tire axial direction to the same direction as the inclining direction of the cords of the radially outermost belt ply, and in the inboard shoulder land portion, said shoulder axial grooves comprise shoulder axial grooves not connected to the shoulder main groove and shoulder axial grooves connected to the shoulder main groove through its narrow part whose width is not more than 1.2 mm, in the outboard shoulder land portion, each of said shoulder axial grooves is not connected to the shoulder main groove so that the outboard shoulder land portion is provided with a circumferentially continuously extending part formed between the shoulder main groove and the outer shoulder axial groove, in each of said crown land portions, said crown axial grooves comprise:

main crown axial grooves extending from the center main groove to the shoulder main groove, axially inside secondary crown axial grooves extending from the center main groove toward the shoulder main groove and terminated within the crown land portion, and axially outside secondary crown axial grooves extending from the shoulder main groove toward the center main groove and terminated within the crown land portion, and in each of said crown land portions, the axially inside secondary crown axial grooves are respectively aligned with the axially outside secondary crown axial grooves.

2. The pneumatic tire according to claim 1, wherein the ratio W2/W1 is 1.15 to 1.55.

3. The pneumatic tire according to claim 1, wherein the angle $\alpha$ of each said crown axial groove with respect to the tire circumferential direction is in a range of from 30 to 80 degrees, and the angle $\beta$ of each said shoulder axial groove with respect to the tire circumferential direction is in a range of from 60 to 90 degrees.

4. The pneumatic tire according to claim 1, wherein junction points of the axially outside secondary crown axial grooves with each said shoulder main groove are provided with chamfers, each chamfer cutting off a corner in which the following three surfaces meet: the groove sidewall of the shoulder main groove, the radially outer surface of the crown land portion and each of the groove sidewalls of the axially outside secondary crown axial groove.

5. The pneumatic tire according to claim 2, wherein the angle $\alpha$ of each said crown axial groove with respect to the tire circumferential direction is in a range of from 30 to 80 degrees, and the angle $\beta$ of each said shoulder axial groove with respect to the tire circumferential direction is in a range of from 60 to 90 degrees.

* * * * *